July 3, 1923.
L. A. DOUGHTY ET AL
BATTERY TERMINAL
Filed Nov. 12, 1921
1,460,895
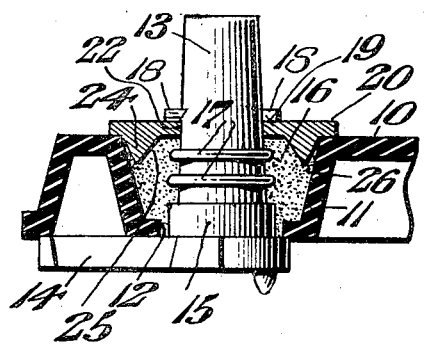
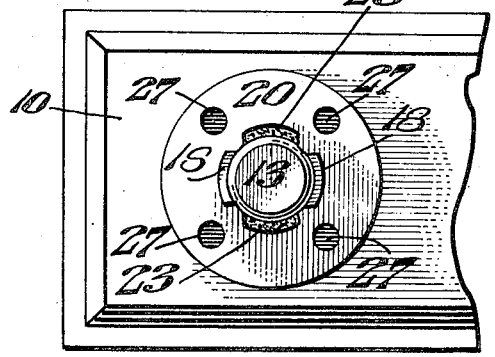
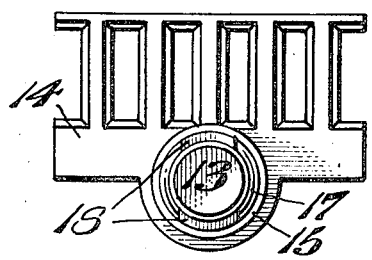
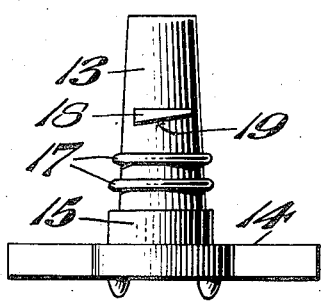
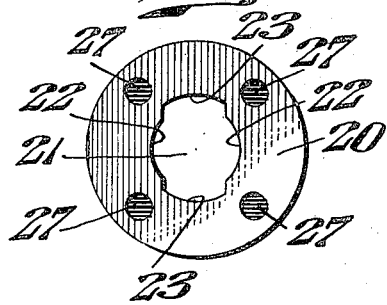
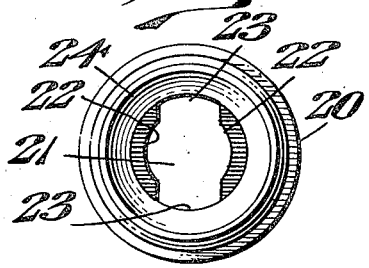
INVENTORS.
Leon A. Doughty and
Frank S. Carlile.
BY Robert M. Barr.
ATTORNEY Patented July 3, 1923.

1,460,895

UNITED STATES PATENT OFFICE.

LEON A. DOUGHTY, OF GLENSIDE, AND FRANK S. CARLILE, OF PHILADELPHIA, PENNSYLVANIA.

BATTERY TERMINAL.

Application filed November 12, 1921. Serial No. 514,642.

*To all whom it may concern:*

Be it known that we, LEON A. DOUGHTY and FRANK S. CARLILE, citizens of the United States, and residents, respectively, of Glenside, county of Montgomery, State of Pennsylvania, and Philadelphia, county of Philadelphia, State of Pennsylvania, have invented certain new and useful Improvements in Battery Terminals, of which the following is a specification.

Some of the objects of the present invention are to provide an improved terminal for storage batteries or the like whereby leakage of the battery acid or liquid is prevented; to provide means for rigidly securing a terminal in operative position upon a battery so that it will not work loose under vibration or jarring; to provide means for automatically taking up variation in the size of terminal parts and forming a homogeneous terminal seal; to provide a battery terminal arranged to be assembled in conjunction with a compound placed under compression; to provide means for rigidly clamping and locking the parts of a terminal to a battery; and to provide other improvements as will hereinafter appear.

In the accompanying drawings, Fig. 1 represents a sectional elevation of an assembled battery terminal embodying one form of the present invention; Fig. 2 represents a plan of the same; Fig. 3 represents a plan of the strap part of the terminal; Fig. 4 represents a side elevation of the strap part; Fig. 5 represents a top plan of one form of locking washer employed in the terminal construction; and Fig. 6 represents a bottom plan of the same washer.

Referring to the drawings, one form of the present invention is shown in Figs. 1 and 2 assembled in conjunction with a cover plate 10 provided with an annular downwardly tapered receptacle 11, the lower end of which preferably terminates in a ring flange 12. The cover 10 is usually of hard rubber, though any other suitable material may be employed for the purpose, and is arranged to close the end of the battery casing in any standard manner.

For attaching an extension terminal conductor to the battery, a post 13 is provided, which is preferably cast as a part of a strap 14, and has a length sufficient to pass through the ordinary terminal fitting and project therefrom to receive the cooperating part of the exterior conductor. The post 13 has a base portion 15 arranged to pass through the flange 12, and its diameter is slightly less than the opening formed by the flange 12 in order to give a clearance to receive a portion of the bonding compound 16 or other material.

In order to increase the lineal length of the post 13, so that any acid leaking or creeping along the joint will have a considerably longer path to travel before reaching the exterior of the cover 10, it is provided with one or more corrugations 17 extending circumferentially about the body of the post 13. Preferably these corrugations 17 are so located as to be within the receptacle 11 and thus serve additionally as an anchoring means for the post 13 when the bonding compound 16 is poured into the receptacle 11 and about the said post.

For the purpose of rigidly uniting the post 13 to the cover 10, a pair of lugs 18 are formed integral with the post 13, projecting at diametrically opposite sides thereof and having tapered or cam shaped lower surfaces 19 arranged to coact with the upper plane surface of a lock washer. This washer 20 is provided with an opening 21, two opposite bounding walls 22 of which are spaced to receive the body of the post 13 below the lugs 18, and two other opposite bounding walls 23 are cut away respectively to conform to the size and shape of the said lugs 18. This construction permits the washer 20 to be slipped over the post 13 and lugs 18 in one position only to seat upon the cover 10. The construction is such that if the washer 20 is now turned about the post 13 as an axis, its upper surface will abut the tapered or cam surfaces 19 to draw and clamp the terminal post 13 rigidly to the cover 10.

To more effectually seal the joints formed by the washer 20 with the cover 10 and with the post 13, a ring flange 24 is formed on the washer 20 and bevelled to conform to the taper of the inner wall of the receptacle 11. Also, the inner side of the flange 24 is curved inward with a cupped formation to provide a recess 25 into which the bonding compound 16 is forced by displacement when the washer 20 is put on. In this connection it should be noted that the diameter of the flange 24 is such as to leave a circumferential clearance 26 into which the compound 16 is pressed.

For causing the washer 20 to be turned to give the desired clamping action, it is provided with a number of holes or sockets 27 which may be engaged by a suitable tool, such as a spanner wrench. It will be understood that various equivalent means may be employed for this purpose without departing from the invention.

It will be apparent from the foregoing that the sealing compound is placed under compression when the device is assembled and in consequence works into and sets in all clearances about the parts and thereby not only automatically takes up for variations in size of the parts but insures a homogeneous seal between the cover and associated parts of the post 13. This serves to prevent leakage and seepage of acid along the joints or otherwise. With the parts assembled and the compound set the post 13 is rigidly held against both vertical and horizontal movement, and the parts become so unified that it is practically impossible for the post to become loose when the battery is in use and subject to the usual vibration, jars or shocks such as occur in a moving vehicle. Further, the post 13 and washer 20 are preferably composed of a lead alloy or any other acid resisting substance so that no corrosion takes place when in use and the life of the terminal is prolonged. Also, as the material is not affected by heat, cold, or acid, the terminal will outwear ordinary terminals having rubber washers or like material which is subject to deterioration.

While the foregoing post construction is shown in conjunction with a battery cover, it will be understood that the invention is not limited in its application to a cover but may as readily be assembled in many kinds of terminal clamps without departing from the scope of the invention.

Although only a single form is shown in which this invention may be embodied, it is to be understood that the invention is not limited to any specific construction, but might be applied in various forms without departing from the spirit of the invention or the scope of the appended claims.

Having thus described our invention, we claim:

1. In a battery terminal, the combination with a battery strap and a terminal post thereon, of a cover plate forming an apertured receptacle through which said post passes, lateral projections formed on said post within said receptacle, a sealing compound in said receptacle and about said projections, a washer arranged to seat on said plate having a circumferential flange extending into said compound, and means including a part on said post for causing said washer to place said compound under compression and for locking said washer in operative position.

2. In a battery terminal, a battery strap, a post integral therewith, projecting lugs on said post having inclined lower surfaces respectively, a washer arranged to fit over said post and having openings to respectively receive said lugs, said washer seating upon a coacting part in such a position as to cause said lugs to engage the top surface of said washer when said washer is turned to thereby exert a clamping action, and a sealing compound about said post and compressed by said washer.

Signed at Philadelphia, in the county of Philadelphia, State of Pennsylvania, this 8th day of November, 1921.

LEON A. DOUGHTY.
FRANK S. CARLILE.